US010772016B2

United States Patent
Chen et al.

(10) Patent No.: US 10,772,016 B2
(45) Date of Patent: Sep. 8, 2020

(54) REAL-TIME USER TRAFFIC CLASSIFICATION IN WIRELESS NETWORKS

(71) Applicant: AT&T Intellectual Property I, L.P., Atlanta, GA (US)

(72) Inventors: Jie Chen, Watchung, NJ (US); Wenjie Zhao, Princeton, NJ (US); Ke Zhang, Jersey City, NJ (US); Huijing Yang, Princeton, NJ (US); Huahui Wang, Bridgewater, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/210,453

(22) Filed: Dec. 5, 2018

(65) Prior Publication Data
US 2020/0187071 A1     Jun. 11, 2020

(51) Int. Cl.
*H04W 36/04* (2009.01)
*H04W 36/30* (2009.01)
(Continued)

(52) U.S. Cl.
CPC ....... *H04W 36/04* (2013.01); *H04W 28/0268* (2013.01); *H04W 36/0022* (2013.01); *H04W 36/22* (2013.01); *H04W 36/30* (2013.01)

(58) Field of Classification Search
CPC . H04W 28/0268; H04W 36/04; H04W 36/22; H04W 36/30; H04W 36/0022
See application file for complete search history.

(56) References Cited

U.S. PATENT DOCUMENTS

| 6,909,888 B2 | 6/2005 | Lee et al. |
| 7,684,320 B1 | 3/2010 | Nucci |
(Continued)

FOREIGN PATENT DOCUMENTS

| EP | 2618524 A1 | 7/2013 |
| EP | 2833672 A1 | 2/2015 |
| WO | 2017065627 A1 | 4/2017 |

OTHER PUBLICATIONS

Nguyen, Thuy T.T., et al. "A Survey of Techniques for Internet Traffic Classification using Machine Learning." IEEE Communications Surveys & Tutorials 10.4 (2008): 56-76. 21 pages. http://citeseerx. ist. psu .edu/viewdoc/download? doi= 10. 1. 1.474.858 &rep=repl&type=pdf.

(Continued)

*Primary Examiner* — Marcos L Torres
(74) *Attorney, Agent, or Firm* — Amin, Turocy & Watson, LLP

(57) ABSTRACT

A device can receive, from a network node device, call trace event data relating to characteristics of a wireless communication session between the network node device and a user equipment. The device can sequence and combine the call trace event data for a period of the wireless communication session. The device can analyze the call trace event data to determine a category of network communication traffic transmitted via a communication channel between the network node device and the user equipment. In response to a determination that the network communication traffic comprises streaming video packets, the device can facilitate directing of network resources to be allocated to support the wireless communication session.

20 Claims, 13 Drawing Sheets

(51) Int. Cl.
*H04W 36/00* (2009.01)
*H04W 28/02* (2009.01)
*H04W 36/22* (2009.01)

(56) References Cited

U.S. PATENT DOCUMENTS

| | | | |
|---|---|---|---|
| 7,782,793 | B2 | 8/2010 | Olesinski et al. |
| 8,352,392 | B2 | 1/2013 | Swift et al. |
| 8,817,655 | B2 | 8/2014 | Szabo et al. |
| 9,172,649 | B2 | 10/2015 | Sampath et al. |
| 9,705,698 | B1 | 7/2017 | Li et al. |
| 9,749,188 | B2 | 8/2017 | Vasseur et al. |
| 9,807,639 | B2 | 10/2017 | Ideses et al. |
| 9,967,188 | B2 | 5/2018 | Kanonakis et al. |
| 9,985,906 | B2 | 5/2018 | Reddy et al. |
| 2013/0268257 | A1* | 10/2013 | Hu ............... G06F 17/5009 703/22 |
| 2014/0334304 | A1 | 11/2014 | Zang et al. |
| 2015/0117259 | A1 | 4/2015 | Xaypanya et al. |
| 2015/0304199 | A1 | 10/2015 | Leask et al. |
| 2016/0309486 | A1* | 10/2016 | Hinkle ............ H04W 72/087 |
| 2016/0337251 | A1 | 11/2016 | Venkataramanan et al. |
| 2017/0041815 | A1* | 2/2017 | Fernandez Arboleda ............... H04L 41/064 |
| 2017/0048746 | A1 | 2/2017 | Ronneke |
| 2017/0111233 | A1 | 4/2017 | Kokkula et al. |
| 2017/0279839 | A1 | 9/2017 | Vasseur et al. |
| 2017/0374089 | A1 | 12/2017 | Anderson et al. |
| 2017/0374090 | A1 | 12/2017 | Mcgrew et al. |
| 2018/0103056 | A1 | 4/2018 | Kohout et al. |
| 2018/0189677 | A1 | 7/2018 | Anderson et al. |
| 2018/0212992 | A1 | 7/2018 | Nikolaev et al. |

OTHER PUBLICATIONS

Auld, Tom, et al. . "Bayesian Neural Networks for Internet Traffic Classification." IEEE Transactions on neural networks 18.1 (2007): 223-239. 17 pages. https:l!www.cl.cam.ac.ukj ... awm22/publication/auld2006bayesian.pdf.

Li, Wei, et al. "A Machine Learning Approach for Efficient Traffic Classification." Modeling, Analysis, and Simulation of Computer and Telecommunication Systems, 2007. MASCOTS'07. 15th International Symposium, IEEE, 2007. 8 pages. http://citeseerx. ist. psu .edu/viewdoc/download?doi= 10. 1. 1.482. 1717&rep=rep1&type=pdf.

Hyun, Jonghwan, et al. "A VoLTE Traffic Classification Method in LTE Network." Network Operations and Management Symposium (APNOMS), 2014 16th AsiaPacific. IEEE, 2014. 6 pages. http://booksc.org/book/35892070/217ed 1.

* cited by examiner

| CT Events | Timestamp | DL/UL Volume | DL/UL Duration | QCI |
|---|---|---|---|---|
| initial context setup | X | | | |
| context release | X | | | |
| radio bearer traffic report | X | X | X | X |
| periodically reported measurements (TA, RF) | X | | | |
| handover events (S1, X2) | X | | | |

FIG. 6

REAL-TIME USER TRAFFIC CLASSIFICATION IN WIRELESS NETWORKS

TECHNICAL FIELD

The present application relates generally to the field of wireless communication and, more specifically, to the classification of network communication traffic in wireless networks.

BACKGROUND

Radio technologies in cellular communications have grown rapidly and evolved since the launch of analog cellular systems in the 1980s, starting from the First Generation (1G) in the 1980s, Second Generation (2G) in the 1990s, Third Generation (3G) in the 2000s, and Fourth Generation (4G) in the 2010s (including Long Term Evolution (LTE) and variants of LTE). Fifth generation (5G) access networks, which can also be referred to as New Radio (NR) access networks, are currently being developed and expected to fulfill the demand for exponentially increasing data traffic, and to handle a very wide range of use cases and requirements, including services such as enhanced mobile broadband (eMBB) services, massive machine type communications (mMTC), and ultra-reliable and low-latency communications (uRLLC).

Traffic has been growing steadily in wireless networks in the past years, and emerging applications such as video streaming keeps the momentum going. It is predicted that video will account for 70% of all mobile traffic within a few years. Video streaming traffic, in particular, is different from other types of traffic. The resources required to maintain an acceptable user experience for video streaming are different than that required for other types of traffic, such as voice over Internet Protocol (VoIP), video downloading, messaging, gaming, and p2p, etc. A small quantity of video sessions (<10%) contribute 50% or more of the total traffic.

The above-described background relating to wireless networks is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 6 illustrates a chart showing examples of call trace (CT) event data, in accordance with various aspects and example embodiments of the subject disclosure.

DETAILED DESCRIPTION

Figure 1:
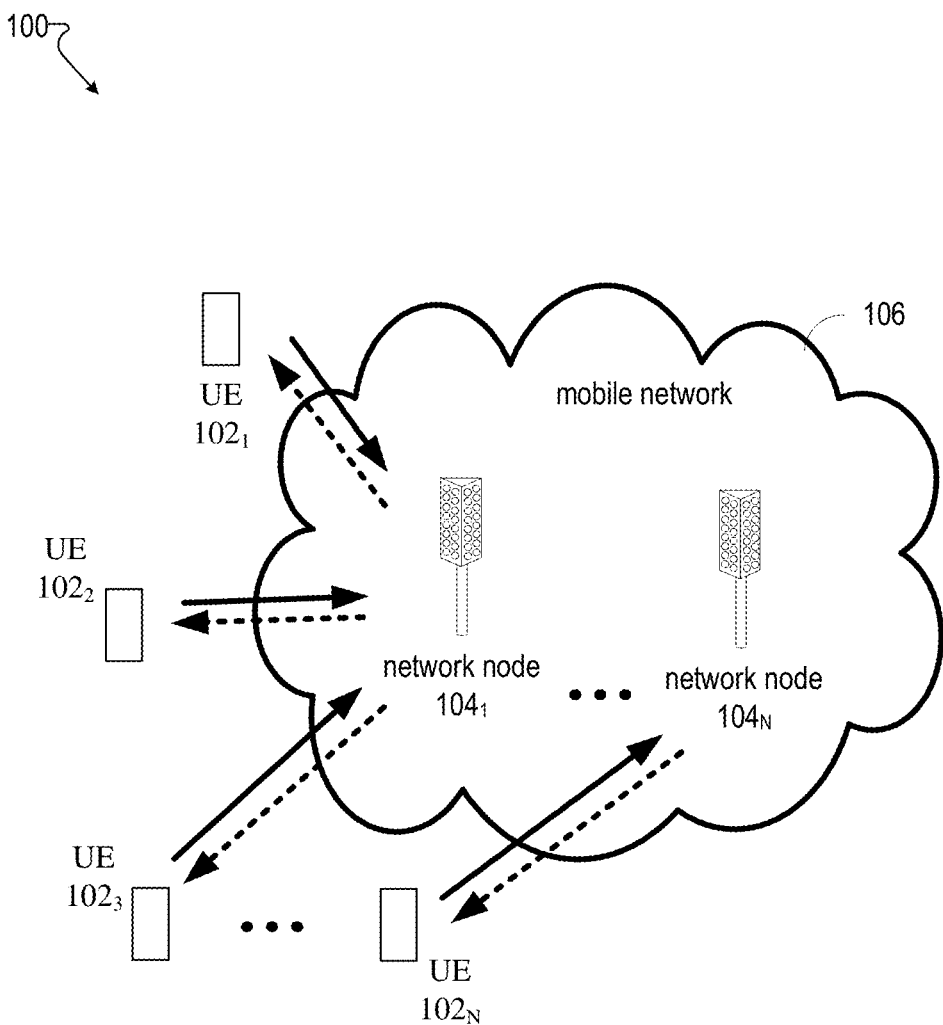
FIG. 1 illustrates an example wireless communication system having a network node device (also referred to herein as a network node) and user equipment (UE), in accordance with various aspects and example embodiments of the subject disclosure.

The subject disclosure is now described with reference to the drawings, wherein like reference numerals are used to refer to like elements throughout. The following description and the annexed drawings set forth example aspects of the subject matter. However, these aspects are illustrative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by devices (e.g., network management device, gateway device, computer, computing device, etc.) comprising programmable processors that execute machine executable instructions (e.g., computer program product, computer-readable instructions, software, software programs, software applications, software modules, etc.) to facilitate performance of the operations described herein. Examples of such devices can be devices comprising circuitry and components as described in FIG. 13.

In the upcoming 5G and other next-gen networks, network services are slated to be handled by decentralized virtual network functions (VNFs) that are instantiated either for a specific service, or group of services. However, there are conditions or events that arise that can require additional resources that exceed the capabilities that can be provided by a particular network slice. The present patent application relates to the provision of network resources, in response to a determination that the network communication traffic comprises streaming video packets. The network resources be allocated to support the communication sessions comprising streaming video traffic using, for example, VNFs and software-defined networking methods.

FIG. 1 illustrates an example wireless communication system 100 (also referred to as wireless system 100, mobile system 100, mobile communications system 100) in accordance with various aspects and embodiments of the subject disclosure. In example embodiments (also referred to as non-limiting embodiments), wireless communications system 100 can comprise a mobile (also referred to as cellular) network 106, which can comprise one or more mobile networks typically operated by communication service providers. The wireless communication system 100 can also comprise one or more user equipment (UE) $102_{1-N}$ (also referred to as UE 102). UE $102_{1-N}$ can communicate with one another via one or more network node devices (also referred to as network nodes) $104_{1-N}$ (referred to as network node 104) of the mobile network 106. The dashed arrow lines from the network nodes $104_{1-N}$ to the UE $102_{1-N}$ represent downlink (DL) communications and the solid arrow lines from the UE $102_{1-N}$ to the network nodes $104_{1-N}$ represent uplink (UL) communications.

UE 102 can comprise, for example, any type of device that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. UE 102 can also comprise IOT devices that communicate wirelessly.

Mobile network 106 can include various types of disparate networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, wireless communications system 100 can be or can include a large scale wireless communication network that spans various geographic areas, and can comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G New Radio (NR) systems, the embodiments can be applicable to any radio access technology (RAT) or multi-RAT system where the UE operates using multiple carriers. For example, wireless communications system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE 102 can be communicatively coupled (or in other words, connected) to a network node 104 of the mobile network 106. Network node 104 can have a cabinet and other protected enclosures, an antenna mast, and multiple antennas for performing various transmission operations (e.g., multiple input multiple output (MIMO) operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay device, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is referred to by some as a gNodeB (gNB) device, which provides NR user plane and control plane protocol terminations towards the UE, and connects to the 5G core.

Still referring to FIG. 1, in various embodiments, mobile network 106 can be configured to provide and employ 5G cellular networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

Considering the different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Still referring to FIG. 1, to meet the demand for data centric applications, features of proposed 5G networks may comprise: increased peak bit rate (e.g., 20 Gbps), larger data volume per unit area (e.g., high system spectral efficiency— for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 Gbps to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Figure 2:
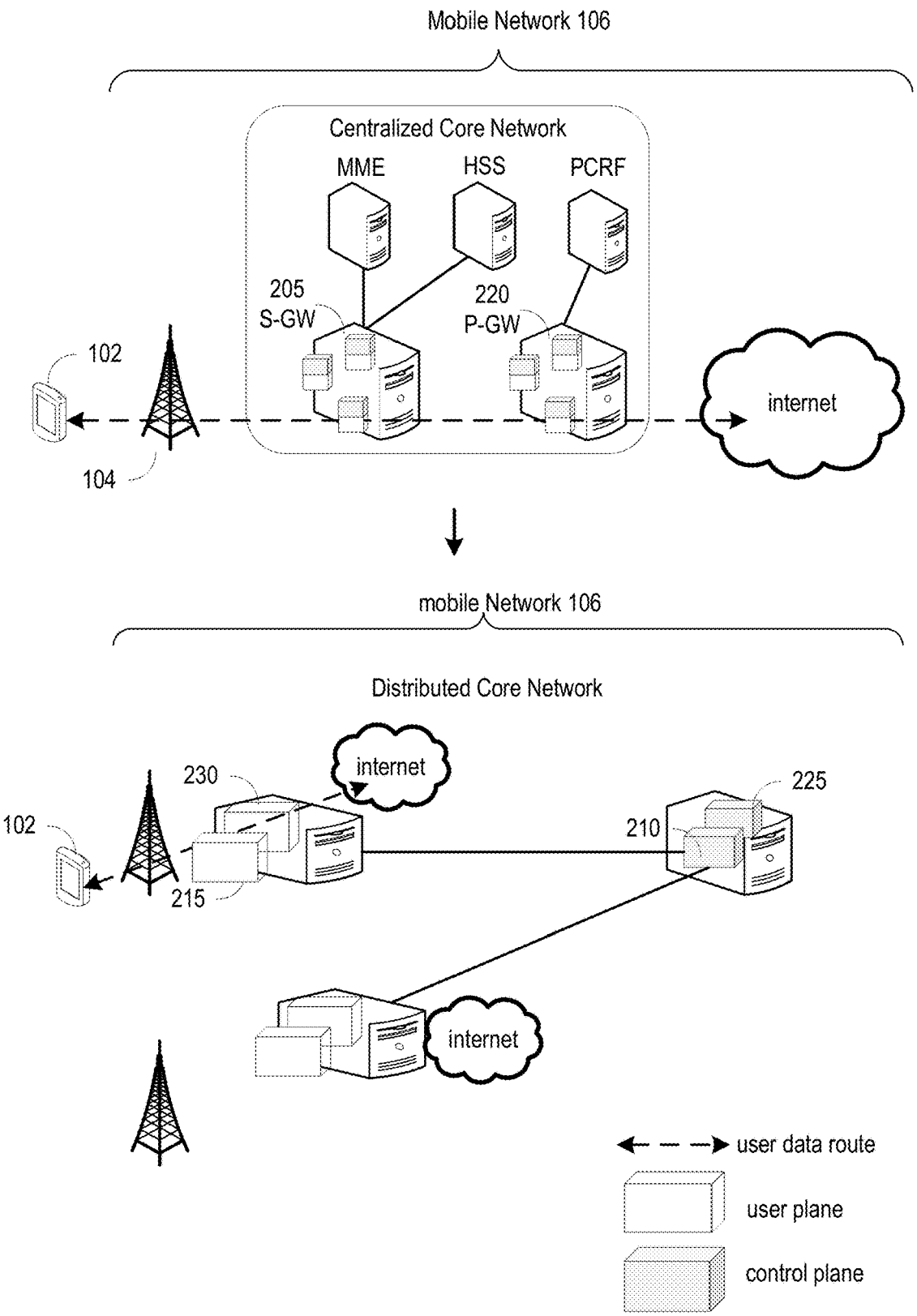
FIG. 2 illustrates an example centralized core network (CN) in comparison with a distributed CN implementing control plane and user plane separation, in accordance with various aspects and example embodiments of the subject disclosure.

Referring now to FIG. 2, the upcoming 5G access network can also employ an architecture in which a user plane and control plane are separate, wherein complex control plane functions are abstracted from forwarding elements, simplifying user plane operations by relocating control logic to physical or virtual servers. Each plane carries a different type of traffic and can be implemented as overlay networks that runs independently on top of one another, although supported by its infrastructure. The user plane (sometimes known as the data plane, forwarding plane, carrier plane, or bearer plane) carries the network user traffic, and the control plane carries signaling traffic. Typical control-plane functionality includes capabilities such as the maintenance of location information, policy negotiation and session authentication. In example embodiments, the planes can be implemented in the firmware of routers and switches. As shown in FIG. 2, a mobile network (e.g., mobile network 106) with a centralized core network (CN) can be decentralized, resulting in a distributed CN, which acts as a controller in a mobile communication network, and performs underlying tasks required for providing mobile communication services (e.g., user authentication, data transmission, etc.). To abstract the network resources from the underlying physical hardware, the control plane and user plane are separated, abstracting the network resources from the underlying physical hardware. This separation allows user-plane functionality to move to the network edge, and management functionality to remain at the core. For example, as shown in FIG. 2, serving gateway (S-GW) 205 in a centralized CN can, in a distributed CN, be separated into a S-GW-C 210 for the control plane and S-GW-U 215 for the user plane, wherein the user plane functionality is closer to the network edge. Likewise, as shown in FIG. 2, the Packet Data Network (PDN) gateway (P-GW) 220 can be separated into P-GW-C 225 for the control plane, and the P-GW-U 230 for the user plane, with the S-GW-U 215 and P-GW-U 230 functionality being moved closer to the edge of the network. In this distributed CN, the physical core can be virtually separated and relocated in the network into multiple virtual core networks using virtualization technology. This software-defined networking (SDN) approach, can be complimentary to a network functions virtualization (NFV) approach, in which a virtual network function (VNF) is responsible for handling specific network functions (NFs) that run on one or more virtual machines (VMs) on top of the hardware networking infrastructure (e.g., routers, switches, etc.). Individual VNFs can be connected or combined to offer a particular network communication service. Both SDN and VNF can facilitate the implementation of network slicing (described further below).

Figure 3:
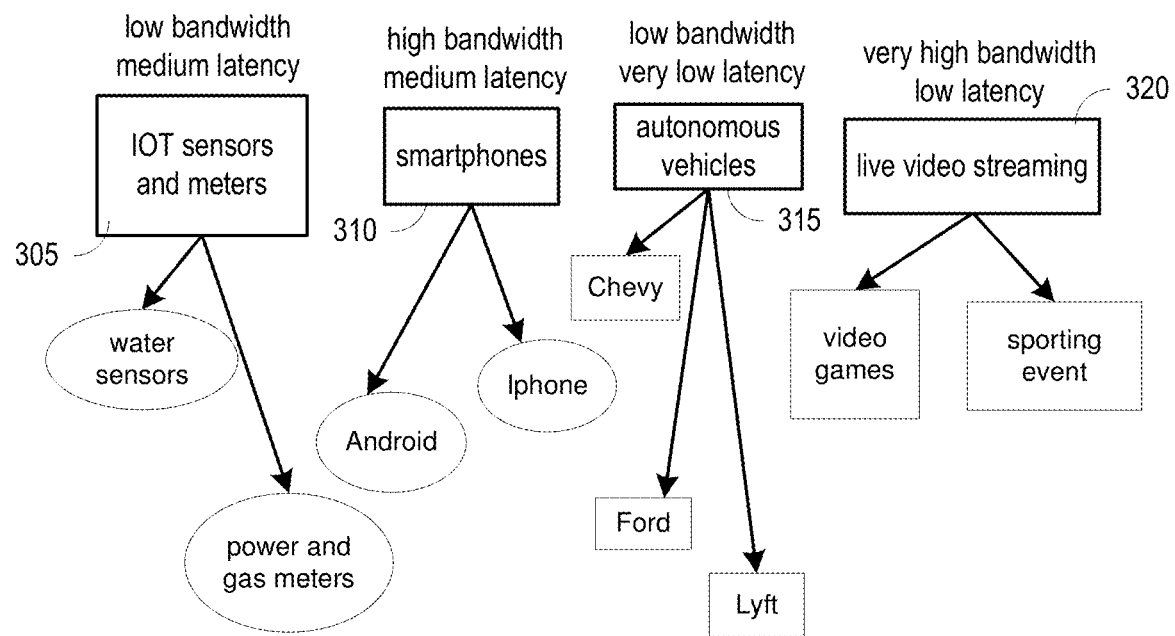
FIG. 3 illustrates the bandwidth and latency requirements for different communication services, in accordance with various aspects and example embodiments of the subject disclosure.

In 5G and other next generation networks, network services can be handled by decentralized virtual network functions, called network slices, that are instantiated either for a specific, dedicated service, or group of services, utilized by subscribers or large enterprises. These slices can be made to perform specific tasks depending on the location, quality of service (QoS) and capacity of a given service. Thus, instead of having one network that serves all devices on the network and performs all services, a single physical network can be sliced into multiple virtual networks that can draw from both CN and radio access network (RAN) resources to provide a specific service. In this manner, network slices can be specifically configured to support a multitude of use cases and new services. Each use case involves performance requirements that vary enormously. As shown in FIG. 3, the bandwidth and latency related to each service can vary. IOT sensors and meters 305 might require service that is low bandwidth and medium latency. Smartphones 310 might require high bandwidth and medium latency. Autonomous vehicle services 315 rely on V2X (vehicle-to-anything) communications which requires low latency but not necessarily a high bandwidth. Live video streaming 320 that supports video games with video streaming and live sporting events might require a very high bandwidth, but low latency. As such, different use cases place different requirements on the network in terms of functionality. Each specific service requires different resources, receiving a specific set of optimized resources and network topology that covers certain service level agreement specified factors for delivering the service, including such factors as such as connectivity, speed, and capacity. For example, for autonomous vehicle services 315, Ford, Lyft, or Chevy might each have a different service level agreement with a network provider to support their autonomous vehicle communication services.

Figure 4:
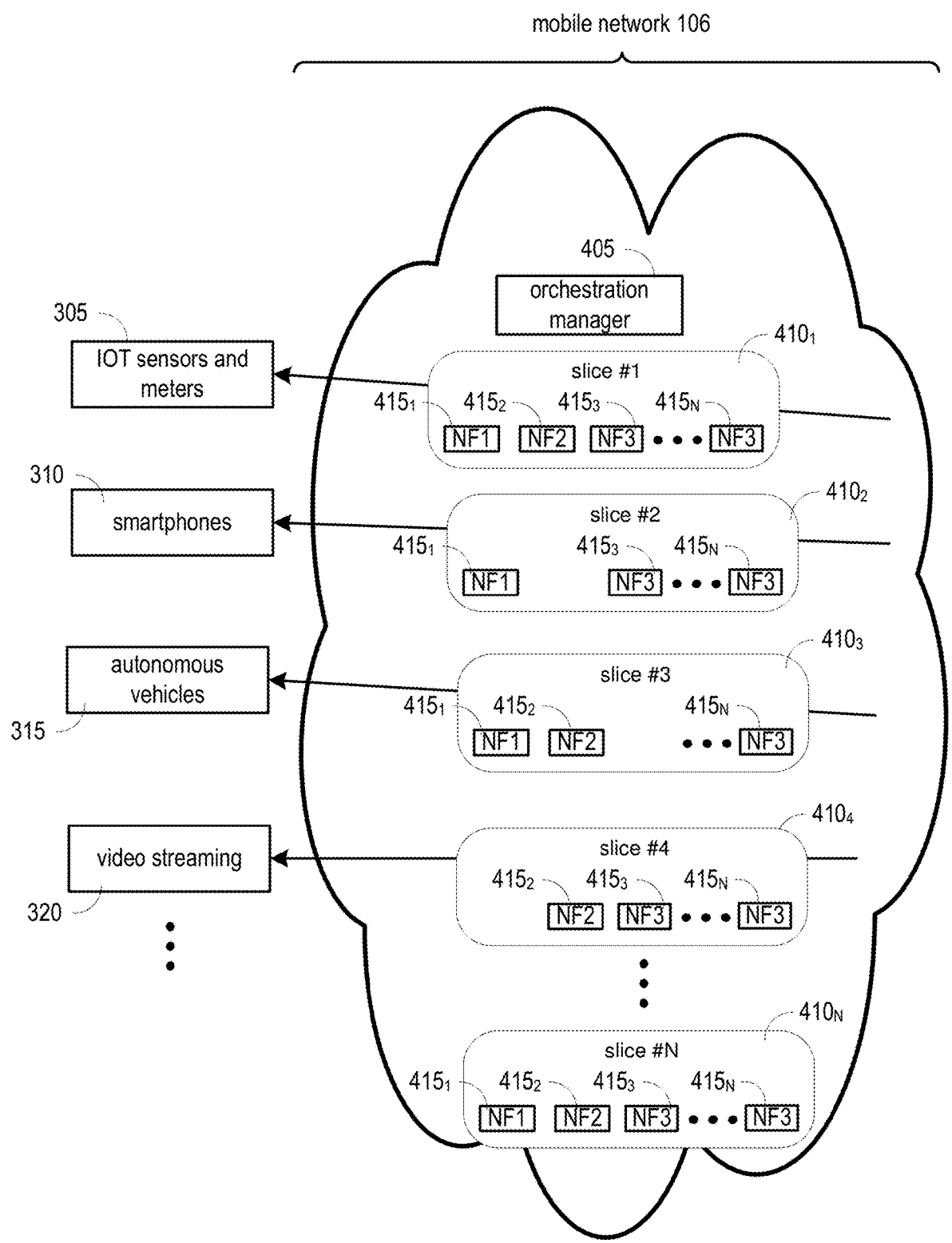
FIG. 4 illustrates an example of network slices, each having combinations of network functions, in accordance with various aspects and example embodiments of the subject disclosure.

Referring now to FIG. 4, a service orchestration manager 405 can instantiate network slices $410_{1-N}$ of the network comprising combinations of VNFs (virtual network functions (NFs)) on default hardware (HW) in order to reduce the network complexity, and provide capital savings on proprietary HW and software. Each network slice can be instantiated, depending on, for example, the location (such as dedicated slice close to a large customer enterprise) or quality of service (e.g., high QoS slice for a premium service). These slices can be part of a cloud network running on a default hardware with given limitations such as number of dedicated processors and memory, etc. As shown in FIG. 4, with network slicing, each of these services can be delivered over the same common physical network on multiple virtual network slices to optimize use of the physical network. A slice #1 $410_1$ can be instantiated to support IOT meters and sensors 305. A slice #2 $410_2$ can serve smartphones. A slice #3 $410_3$ can serve autonomous vehicle services 315. A slice #4 $410_4$ can support live video streaming 320. N number of slices in the network (e.g., slice # N $410_N$) can be instantiated to support other services. Each network slice can comprise an independent set of logical, network functions NFs $415_{1-N}$ (also referred to herein as tasks) that support the requirements of particular services (e.g., the term "logical" can refer to software), with some NFs that can be shared across multiple slices (e.g., NF1 $415_1$ is common across the slices), while other NFs are tailored to a particular network slice. An NF can comprise network nodes functionality (e.g. session management, mobility management, switching, routing functions) which has defined functional behavior and interfaces. Thus, NFs can be implemented as a network node (e.g., network node 104) on a dedicated hardware or as virtualized software functions. The service orchestration manager 405 can perform selection functions, for example using SDN, that pair the resources and network topology (e.g., RAN and fixed access, terminal, transport, and CN resources) needed for the specific service and traffic that uses the slice. In this way, functions such as speed, capacity, connectivity and coverage can be allocated to meet the specific demands of each use case. Not only can a network slice be specifically instantiated for certain services, it can be reused.

Due to the privacy and protocol regulations, most applications in the wireless networks are encrypted so that it is difficult to identify user's traffic category, including in real time (e.g., live video streaming) Since most application information are encrypted, the wireless operators only know the traffic types of small amount. For example, video optimization algorithms could only be applied to limited number of applications which are revealed to the operators. There has been little research related to identifying the application/service type from radio access networks (RAN), or even the core networks. Based on mobile user's reports, a small proportion of users voluntarily report their application types, but the data is only available offline.

Current network prioritization is based on QCI classes instead of service types. QoS Class Identifier (QCI) is a mechanism used in 3GPP Long Term Evolution (LTE) networks to ensure bearer traffic is allocated appropriate Quality of Service (QoS). Different bearer traffic requires different QoS and therefore different QCI values. However, radio access network (RAN) algorithms do not prioritize a certain video service (e.g., real-time video streaming) over another non-streaming video service (e.g., background file download) based on their different QoS requirements, such as throughput and latency.

There is also no ability for current networks to perform real-time classification of traffic to determine whether the traffic is video streaming traffic, which consumes a lot of bandwidth/resource with high volumes and long durations. In the present art, traffic reports can be used to categorize user traffic according to the overall duration and traffic volume. However, this is conducted after the session ends and cannot help real-time user traffic control. A real-time determination can enable more performance optimization in the subsequent period before the video session ends.

Figure 5:
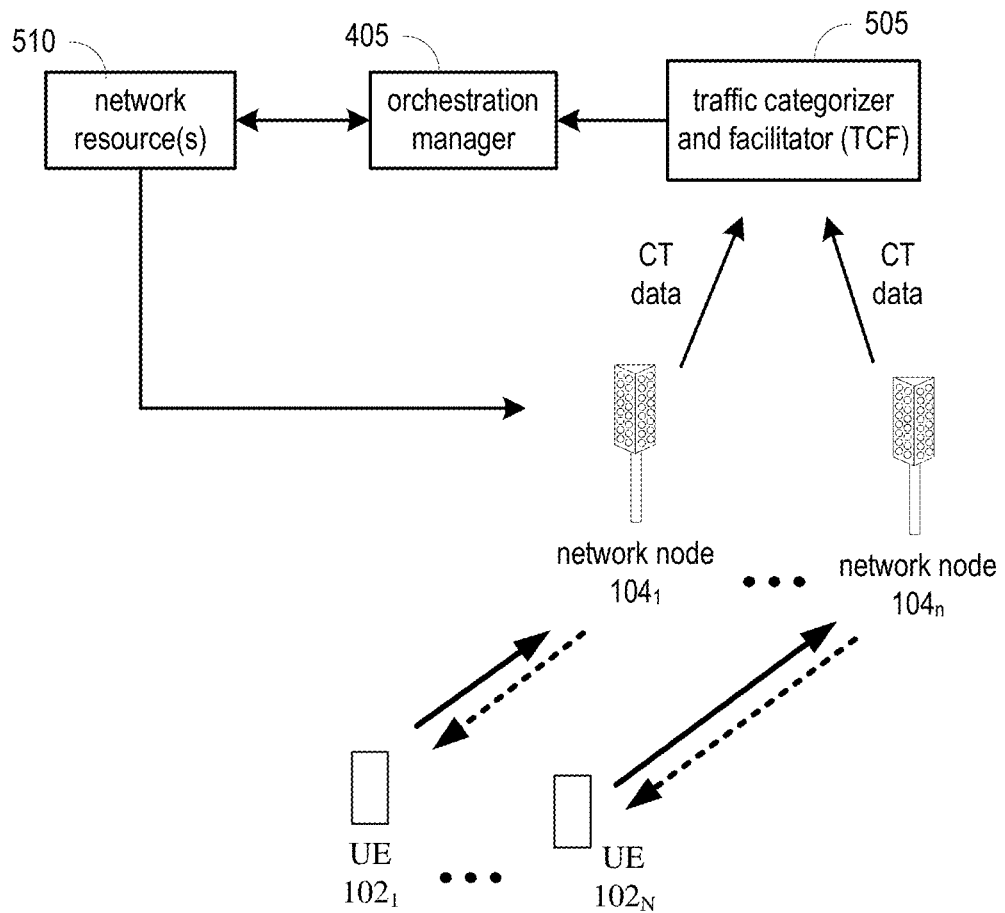
FIG. 5 illustrates an example system in which a traffic categorizer and facilitator (TCF) device can operate, in accordance with various aspects and example embodiments of the subject disclosure.

FIG. 5 depicts an example systems and methods (e.g., traffic categorizer and facilitator 505 (TCF 505) performing operations as described herein) that can allow for traffic of different types to be categorized such that the traffic can be addressed in the software defined network (SDN) and network slicing framework differently, in accordance with example embodiments of the present application. The TCF 505, can comprise one of more computing devices, e.g., located within mobile network 106.

The TCF 505 can also be operable to categorize traffic in real-time, enabling more resources to be made available through SDN and network slicing, before a video streaming session has concluded. As such, the TCF 505 of the present application can facilitate large-scale user traffic classification for UE level real-time network control and traffic prediction (e.g., real-time traffic classification to identify video-streaming like transmissions between the network node and UEs (long duration and large traffic) among general traffic (various durations and low traffic) in the early stage of new radio resource control (RRC) sessions (like 10 seconds, 20 seconds, 30 seconds, 120 seconds, etc.).

Still referring to FIG. 5, in example embodiments in accordance with the present application, the TCF 505 can serve as a framework for real-time user traffic classification in a mobile network. The TCF 505 is operable to receive real-time streaming network data, in that the streaming network data is being received while a video streaming session experienced by a UE (e.g., UE $102_{1-N}$), served by network nodes (e.g., network nodes $104_{1-N}$). In example embodiments, the real-time streaming network data can comprise streaming call trace (CT) events data, reported to the TCF 505 by network nodes in real-time for each UE serviced by each network node. Different types of CT events (see, e.g., FIG. 6 below), can be combined into a sequence of traffic reports ordered by time (see, e.g., FIG. 7 below). The TCF 505 can implement a machine-learning model that predicts user's traffic category based on these generated CT event sequences during the early stage of UE software application sessions.

In example embodiments, labels (e.g., labeling a session as streaming-video, downloaded video, etc.) used in conjunction with training and validation data are derived based on either known application information or traffic report characteristics. An offline training model can be used to acquire historical CT events of existing sessions with known application category and form a time sequence of CT events. The time sequence of CT events can be formulated as a sequence classification task, wherein CT event sequences are taken during the early stage of an application session as input, and the traffic category of that session is used as the output. Various machine-learning classification models (e.g., algorithms) including but not limited to gradient boosting machine, random forecast classification, and Long Short-Term Memory (LSTM) neural network, can be used to "train" the TCF 505.

An optimal model (e.g., model for categorizing traffic) can be formulated by the TCF 505 based on the performance metrics (accuracy, precision, and recall, etc.) in the validation processes. The well-trained model can then be applied to real-time streaming data (e.g., CT events data) to recognize UE traffic categories. Thus, in practice mode (e.g., not offline-training), the well-trained classification model can be applied by the TCF 505 to all mobile user's UEs in real time based on the reported TCF event sequences during the early stages of application sessions/connections (e.g., within seconds of the active application session). Again, the categorization during the early stages of the application sessions allow for a real-time categorization of the traffic, as opposed to obtaining reports after the application sessions have ended. Categorization during the early stages allows for additional resources, for example, to allocated to service an application streaming video data, so that the user experience does not suffer (e.g., delays due to jitters, buffering, etc. causing a disjointed video-viewing experience) when a user views a video-streaming application on his or her UE. For example, referring to FIG. 5, after categorization of traffic being received by a UE (e.g., UE $102_1$), the TCF 505 can facilitate the allocation of resources for video-streaming applications of a UE by sending a signal to, for example, an orchestration manager (e.g., service orchestration manager 405), which as mentioned above, can orchestrate, via SDN, network resources (e.g., network resources 510) to be allocated for video-streaming applications to better optimize the bandwidth allocated for the identified video-streaming application session run by the UE. Thus, this real-time traffic categorization can facilitate user-centric optimization so that the user experience for video-streaming application sessions can be enhanced.

Additionally, the TCF 505 can conduct the prediction for each user/session continuously to improve the classification confidence over time.

FIG. 6 illustrates a chart 600 showing examples of call trace event data (CT event data), wherein the "X" in each grid represents some indicator or value (e.g., time, gigabytes, etc.). The TCF 505 can utilize existing reported call trace event records from network nodes without introducing additional burden on the network traffic flow. As examples, a CT event data can be an initial context setup message—when a UE goes from idle to active, this message is sent by, for example, the mobility management entity (MME), to request the setup of a UE bearer channel, and then the UE can upload or download on the bearer channel that is set up by the network node for the UE. A CT event can be a context release, which can be sent when a call is ended, and the UE no longer needs the bearer channel, or when there is a handover (e.g., when connecting from cell one to cell two). An event might have time stamps associated with it, traffic downlink/uplink (DL) volume, UL/DL duration, and QCI. For example, CT event data can comprise a radio bearer traffic report, which provides the download and upload volume of a UE within a past period (e.g., video streaming traffic would tend to be indicated by higher volume), downlink and uplink durations (e.g., video streaming traffic would tend to be indicated by longer downlink and uplink durations), and the QCI of the traffic type that was downloaded (e.g., for example a QCI can indicate that the session involves a voice call).

A CT event can include, in general, periodically reported call trace records (e.g., periodically reported measurements). Specifically, for example, a radio UE timing advance (TA) measurement can be used, since a UE's TA measurements are reported periodically (e.g., every minute). Additionally, periodic RF measurements (e.g., reference signal received power (RSRP) and reference signal received quality (RSRQ) measurements can also be used as a periodic call trace record.

CT event data can also comprise handover events (e.g., when a wireless communication session is handed off from one mobile communication cell to another).

CT event data can also comprise time stamps that are constantly made and reported while the UE application session is still active.

Figure 7:
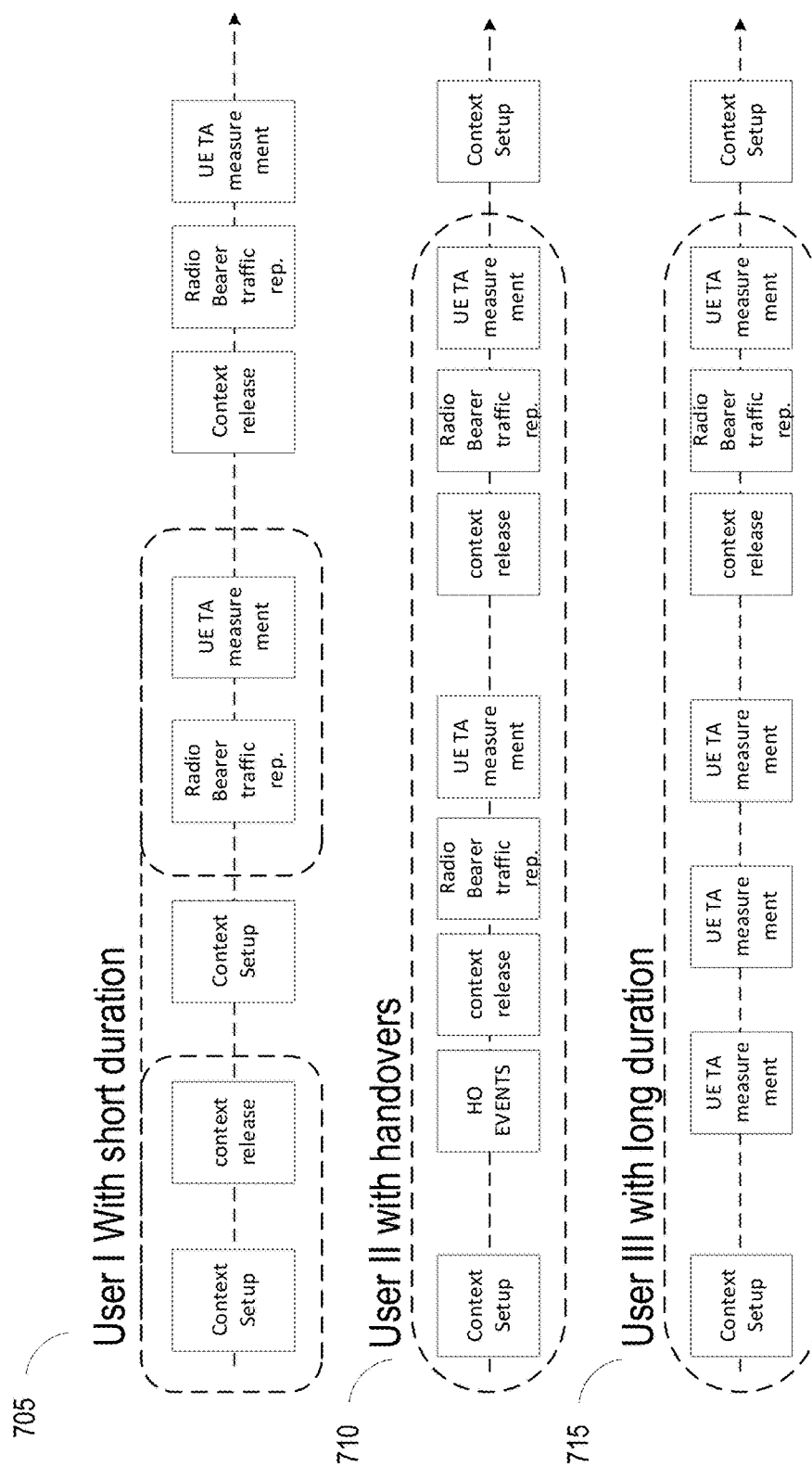
FIG. 7 illustrates an example of CT events sequenced and combined, for traffic related to three example UEs, in accordance with various aspects and example embodiments of the subject disclosure.

The reporting of these CT events and their associated data elements (e.g., time stamp, etc.) by a network node can be used by the TCF 505 to determine a sequence of CT events, as shown by FIG. 7 below, wherein multiple call trace event records can be combined to form a time sequence of user application activities for classification. While no one event might be dispositive as to identifying whether traffic is live video streaming traffic, collectively the sequenced CT events can provide a better guess (e.g., higher probability) as to whether traffic comprises live video-streaming traffic.

As shown in the example illustrated by FIG. 7, for each UE, the TCF 505 can identify the active period (shown in dash-lined boxes in FIG. 7) starting with context setup and ending with last context release, before next context setup. Handover events with timestamp are also included within the active periods. TA measurements, radio bear traffic reports are also identified within the same active period based on their reported serving cell ID and s1apID, since their reported timestamps may be later than the next context setup due to network settings. CT events are ordered within the same active period by their timestamps.

Still referring to FIG. 7, the TCF 505 can use machine learning tools to perform traffic classification in an automated fashion and more efficiently. As an example, a combination of CT events can be used by the TCF 505 to better determine a conclusion as to what the category of the traffic is (e.g., make a prediction). For example, for a User I with short duration session 705, if there is a short duration between a context setup to a context release, it can mean that the communication session has ended. For a User II with handovers session 710, if a UE is still communicating, there can be a call event trace that is a handover (HO) event, followed by a release. Right after the handover, there can be a radio bearer traffic report, as well as a UE TA measurement. These can all be indications that there is a continuing handover of the session from cell to cell. If, in addition to the other CT events data, the bearer report has a QCI value that indicates that this is not a voice call, it can be determined, or predicted, that this is more likely to be a video-streaming session. For User III with long duration session 715, after setup, there are multiple UE TA measurements but no context releases, which can indicate, along with QCI indication that it is not a voice call, that this might be a user that is using a cellphone application that comprises video-streaming. Thus, a combination of CT events, and when they occurred, can be used by the TCF to determine, or predict, whether an active communication session between a UE and network node comprises live video-streaming (e.g., that the packets that are being passed on the radio bearer channel are packets related to video-streaming).

Figure 8:
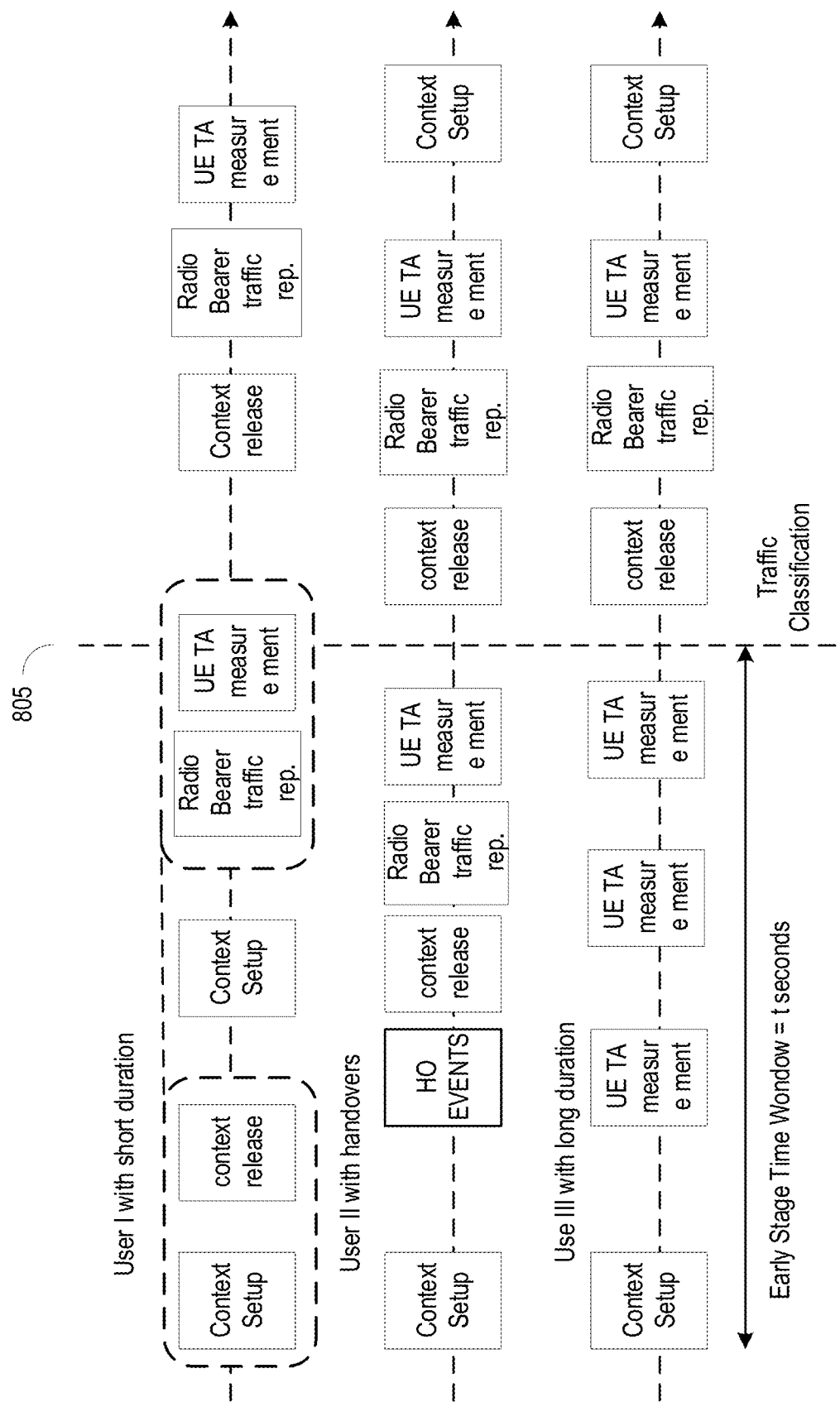
FIG. 8 illustrates an example of an early stage window in which traffic categorization can take place, in accordance with various aspects and example embodiments of the subject disclosure.

Additionally, as indicated by vertical dashed line 805 in FIG. 8, the TCF 505 can determine a traffic classification before the wireless communication session is over. Instead of waiting until the end of the UE activity, the TCF 505 categorizes traffic type within the t seconds of context setup (the early stage). This allows for time for resources to be allocated to a session identified as involving video-streaming, which can result in a better user experience when a user uses a video-streaming application.

Figure 9:
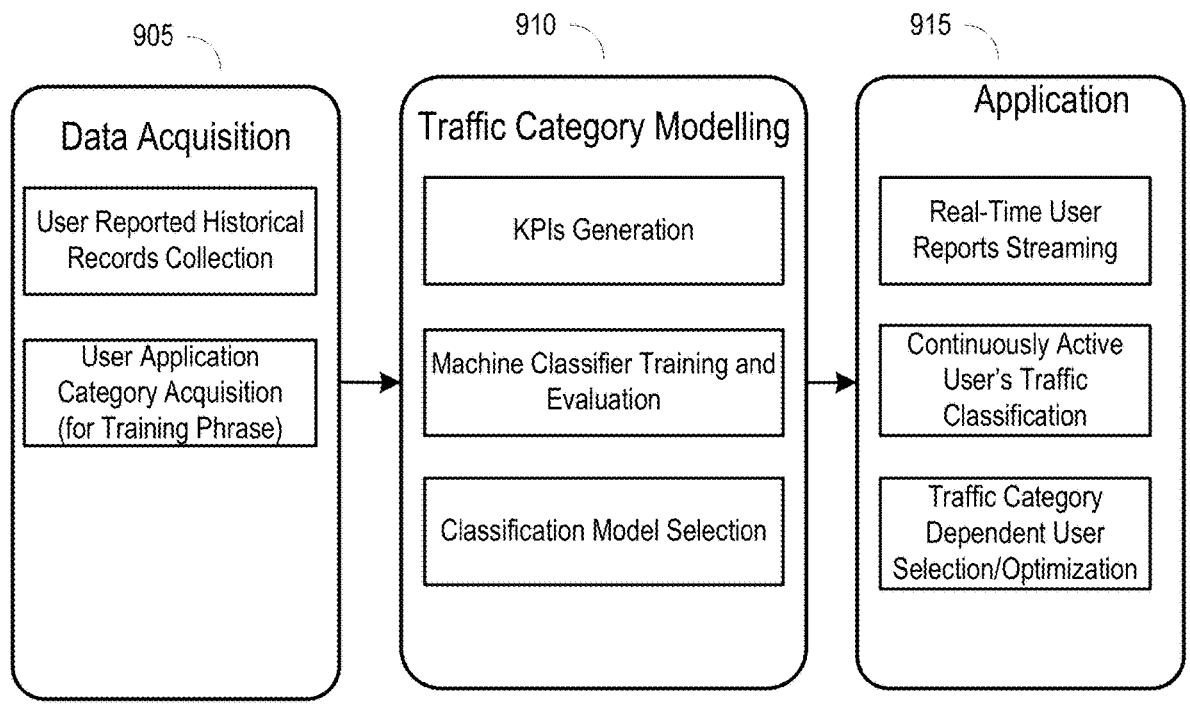
FIGS. 9-12 illustrate example operations that can be performed by a TCF, in accordance with various aspects and example embodiments of the subject disclosure.

FIG. 9 illustrates an example process by which UE traffic can be categorized in real-time by a TCF 505.

At data acquisition stage 905, the TCF 505 can be operable to receive, or collect, user UE reported historical records. The historical records can relate a UEs reports and messages related to its application sessions, including such information as CT events associated with an application session, examples of which CT events are shown and described above with respect to FIG. 7. The TCF 505 can then perform user application category acquisition, in which it acquires, based on the CT events, the capability to discern between traffic of one category versus another.

In the traffic category modelling stage 910, key performance indicators (KPIs) are generated, and TCF 505 undergoes machine classifier training and evaluation, in which CT events are input into the system for it to "train" itself to evaluate whether, based on a combination of CT events, traffic comprises live video-streaming packets. After training and evaluation based on multiple sets of CT event data, the TCF 505 develops a model by which it can determine and categorize traffic based on, for example, less than a few minutes of provided CT event data related to a UE.

At the application stage 915, the TCF 505 can apply its model to real-world UE traffic. The TCF 505 can, for example, receive, via a network node device (e.g., network node 104) coupled with a UE (e.g., UE 102), CT events data (e.g., real-time user reports, time stamps, bearer traffic reports, context setup and release messages, HO events, etc.) streamed to it. After combining the CT events data, the TCF 505 can be operable to continuously classify traffic from UEs, and depending on the determination of whether that a UE's traffic relates to live streaming video, facilitate the selection/optimization of resources for that UE.

Figure 10:
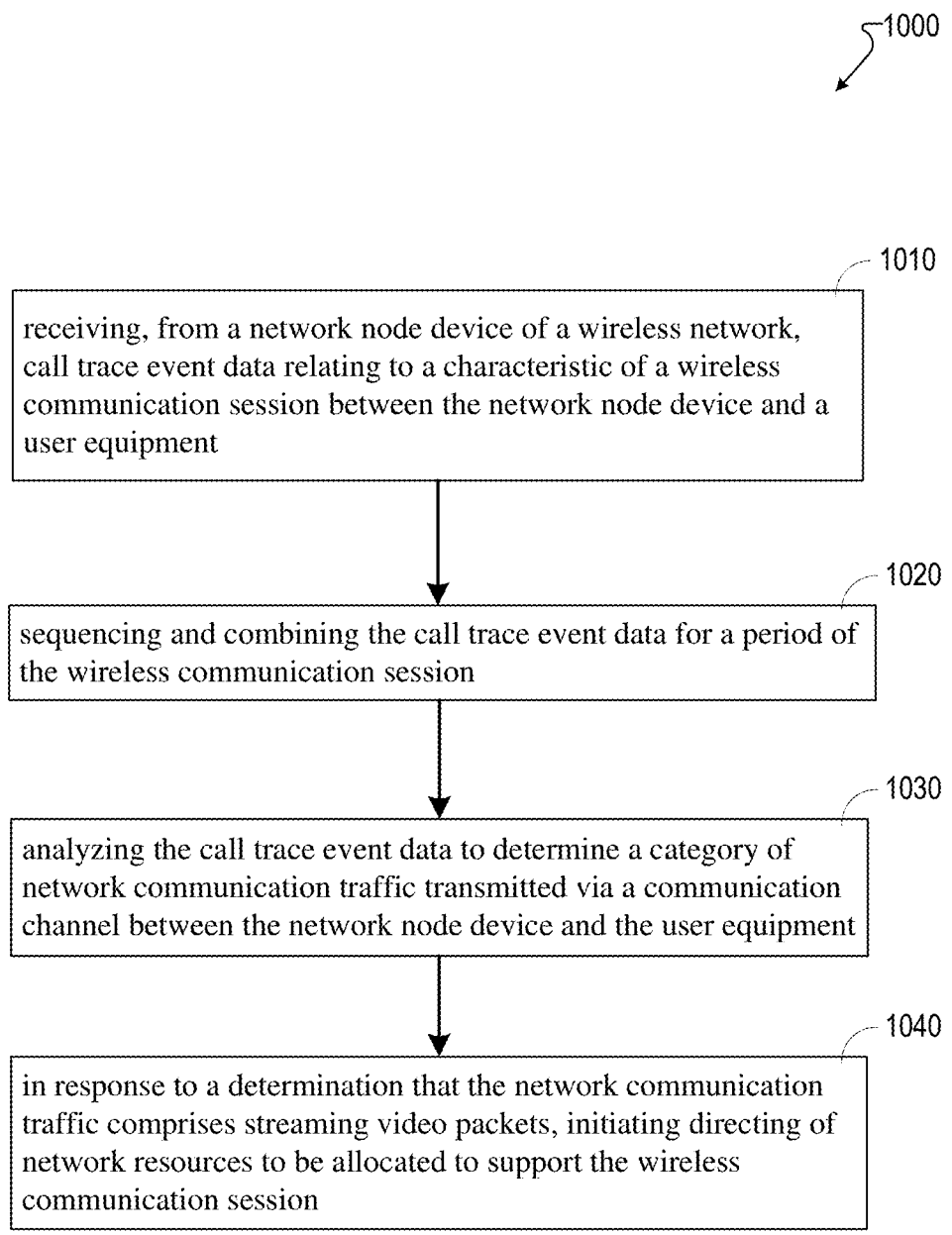
Figure 11:
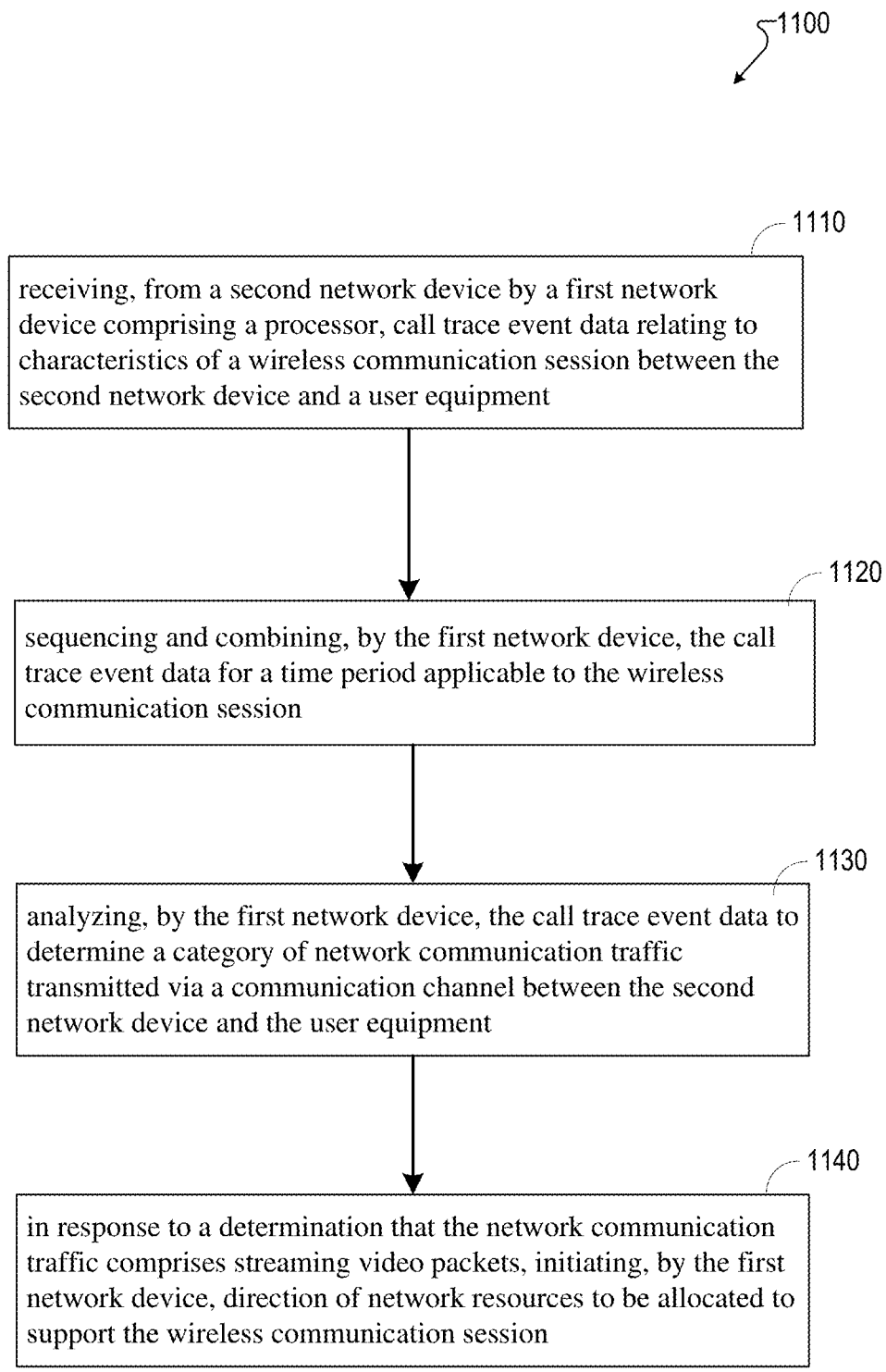
Figure 12:
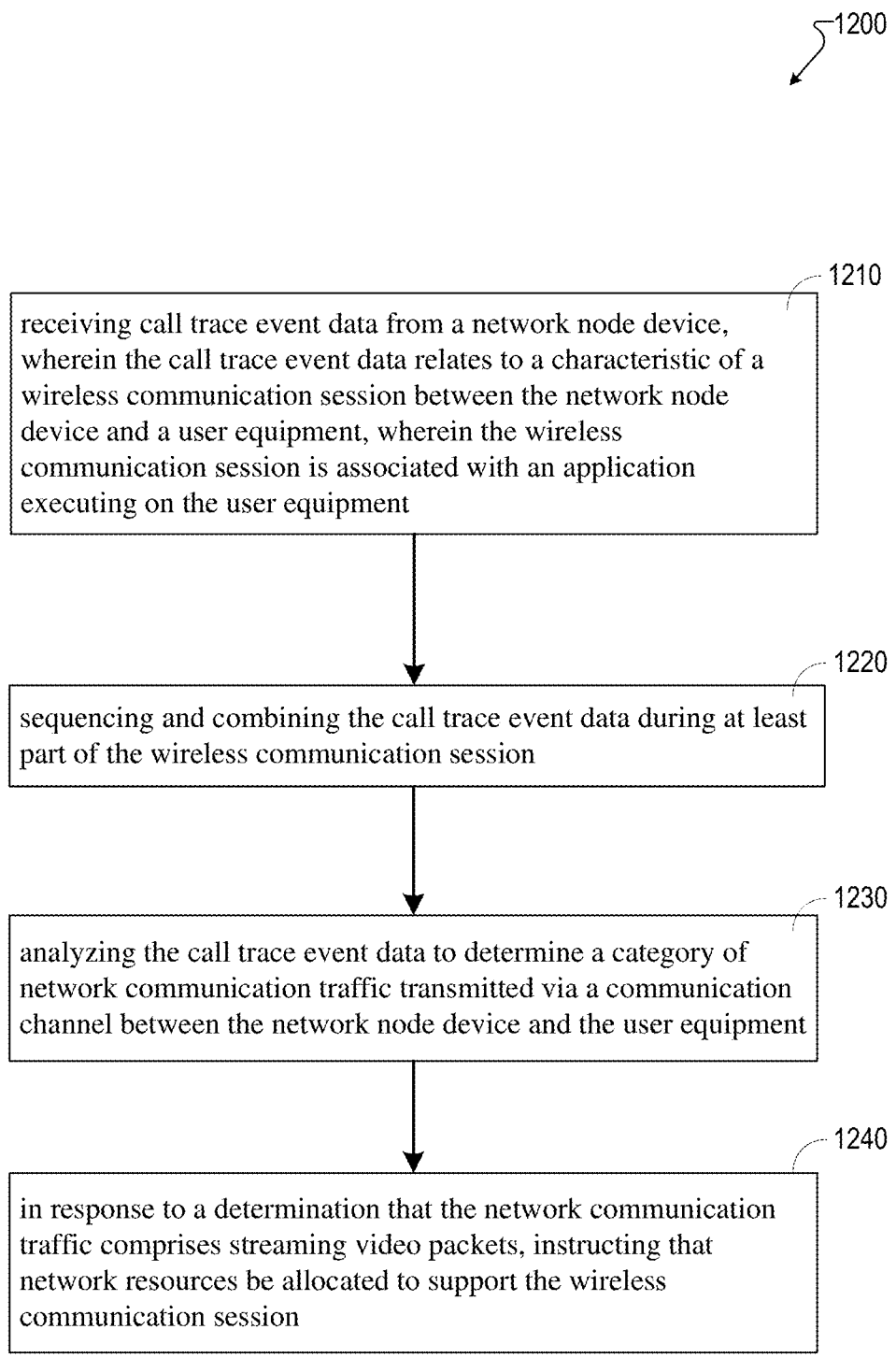

FIGS. 10-12 illustrate flow diagrams of example operations that can be performed, for example, by a TCF (e.g., TCF 505), in accordance with example embodiments of the subject patent application. In example embodiments, the TCF can comprise a device comprising a processor and a memory that stores executable instructions that, when executed by the processor, facilitate performance of operations as described in this application. The instructions can be stored on, for example, a machine-readable storage medium (e.g., the memory). Aspects as described in each flow diagram, or block within a flow diagram, can be interchanged, or used, in each other flow diagram, or can be combined to comprise an operation not described in the flow diagrams.

Referring now to FIG. 10, example operations 1000, which can be performed by TCF 505, can comprise, at step 1010, receiving, from a network node device (e.g., network node device 104) of a wireless network (e.g., wireless communications system 100), call trace event data relating to a characteristic of a wireless communication session between the network node device and a user equipment (e.g., UE 102). The call trace event data (e.g., see FIG. 6) can comprise initial context setup data related to establishing the communication channel. The call trace event data can comprise context release data, wherein the context release data relates to a release of the communication channel for future transmissions. The call trace event data can also comprise a radio bearer traffic report comprising a quality of service class identifier used by the device to determine that the network communication traffic comprises voice packets. The call trace event data can comprise a time stamp indicative of a time at which the call trace event data was recorded. The call trace event data can comprise a periodically reported measurement (e.g., timing advance measurement related to a synchronization of signals transmitted between the user equipment and the network node device, RF measurements (e.g., RSRP, RSRQ). The call trace event data can comprise handover event data relating to a handover of the wireless communication session from a first mobile network cell of the wireless network to a second mobile network cell of the wireless network. The call trace event data can comprise a traffic downlink indicator. The call trace event data can comprise a downlink duration indicator. The call trade event data can also comprise a quality of service class identifier (QCI).

The operations 1000 can further comprise, at step 1020, sequencing and combining the call trace event data for a period of the wireless communication session (e.g., see FIG. 7, FIG. 8).

The operations 1000 can further comprise, at step 1030, analyzing the call trace event data to determine a category (or, in other words, classification) of network communication traffic transmitted via a communication channel between the network node device and the user equipment. The network communication traffic can be associated with an application executing on the user equipment (e.g., a live-streaming video application).

The operations 1000 can comprise, at step 1040, in response to a determination that the network communication traffic comprises streaming video packets (e.g., live streaming video packets), initiating directing of network resources to be allocated to support the wireless communication session. The TCF 505 can, for example send a message to an orchestration manager device (e.g., service orchestration manager 405), the message facilitating an allocation of the network resources. The network resources can be allocated using a software defined networking process (e.g., SDN, as described above with respect to FIG. 2). The network resources can be associated with a network slice dedicated to performing a defined network function (e.g., as shown in FIG. 4). The network resources, when allocated, result in an increase in an amount of bandwidth used for the streaming video packets for the wireless communication session. For example, the number of physical resource blocks (PRBs) carrying video streaming packets in a time period, can be increased.

Referring now to FIG. 11, example operations 1100, which can be performed by a first network device (e.g., TCF 505), can comprise, at step 1110, receiving, from a second network device (e.g., network node 104) by a first network device comprising a processor, call trace event data relating to characteristics of a wireless communication session between the second network device and a user equipment (e.g., UE 102). The call trace event data (e.g., see FIG. 6) can comprise initial context setup data related to establishing the communication channel. The call trace event data can comprise context release data, and wherein the context release data relates to a release of the communication channel for future transmissions. The call trace event data can comprise a radio bearer traffic report comprising a quality of service class identifier used by the device to determine that the network communication traffic comprises voice packets. The call trace event data can comprise a time stamp indicative of a time at which the call trace event data was recorded. The call trace event data can comprise a periodically reported measurement (e.g., timing advance measurement related to a synchronization of signals transmitted between the user equipment and the network node device, RF measurements (e.g., RSRP, RSRQ). The call trace event data can comprise handover event data relating to a handover of the wireless communication session from a first mobile network cell of the wireless network to a second mobile network cell of the wireless network. The call trace event data can comprise a traffic downlink indicator. The call trace event data can comprise a downlink duration indicator. The call trade event data can also comprise a quality of service class identifier (QCI).

The operations 1100 can comprise, at step 1120, sequencing and combining, by the first network device, the call trace event data for a time period applicable to the wireless communication session (e.g., see FIG. 7, FIG. 8).

The operations 1100 can comprise, at step 1130, analyzing, by the first network device, the call trace event data to determine a category of network communication traffic transmitted via a communication channel between the second network device and the user equipment.

The operations 1100 can further comprise, at step 1140, in response to a determination that the network communication traffic comprises streaming video packets, initiating, by the first network device, direction of network resources to be allocated to support the wireless communication session. The TCF 505 can, for example send a message to an orchestration manager device, the message facilitating an allocation of the network resources. The network resources can be allocated using a software defined networking process (e.g., SDN, as described above with respect to FIG. 2). The network resources can be associated with a network slice dedicated to performing a defined network function (e.g., as shown in FIG. 4). The network resources, when allocated, result in an increase in an amount of bandwidth used for the streaming video packets for the wireless communication session. For example, the number of physical resource blocks (PRBs) carrying video streaming packets in a time period, can be increased.

Referring now to FIG. 12, example operations 1200, which can be performed by a network device (e.g., TCF 505), can comprise, at step 1210, receiving call trace event data from a network node device (e.g., network node 104), wherein the call trace event data relates to a characteristic of a wireless communication session between the network node device and a user equipment (e.g., UE 102), wherein the wireless communication session is associated with an application executing on the user equipment. The call trace event data (e.g., see FIG. 6) can comprise initial context setup data related to establishing the communication channel. The call trace event data can comprise context release data, wherein the context release data relates to a release of the communication channel for subsequent communication sessions. The call trace event data can comprise a radio bearer traffic report comprising a quality of service class identifier used by the network device to determine that the network communication traffic does not comprise streaming video packets. The call trace event data can comprise a time stamp indicative of a time at which the call trace event data was recorded. The call trace event data can comprise a periodically reported measurement (e.g., timing advance measurement related to a synchronization of signals transmitted between the user equipment and the network node device, RF measurements (e.g., RSRP, RSRQ). The call trace event data can comprise handover event data relating to a handover of the wireless communication session from a first mobile network cell of the wireless network to a second mobile network cell of the wireless network. The call trace event data can comprise a traffic downlink indicator. The call trace event data can comprise a downlink duration indicator. The call trade event data can also comprise a quality of service class identifier (QCI).

The operations 1200 can further comprise, at step 1220, sequencing and combining the call trace event data during at least part of the wireless communication session (e.g., see FIG. 7, FIG. 8).

The operations 1200 can further comprise, at step 1230, analyzing the call trace event data to determine a category of network communication traffic transmitted via a communication channel between the network node device and the user equipment.

The operations 1200 can further comprise, at step 1240, in response to a determination that the network communication traffic comprises streaming video packets, instructing that network resources be allocated to support the wireless communication session. The TCF 505 can, for example send a message to an orchestration manager device, the message facilitating an allocation of the network resources. The network resources can be allocated using a software defined networking process (e.g., SDN, as described above with respect to FIG. 2). The network resources can be associated with a network slice dedicated to performing a defined network function (e.g., as shown in FIG. 4). The network resources, when allocated, result in an increase in an amount of bandwidth used for the streaming video packets for the wireless communication session. For example, the number of physical resource blocks (PRBs) carrying video streaming packets in a time period, can be increased.

Figure 13:
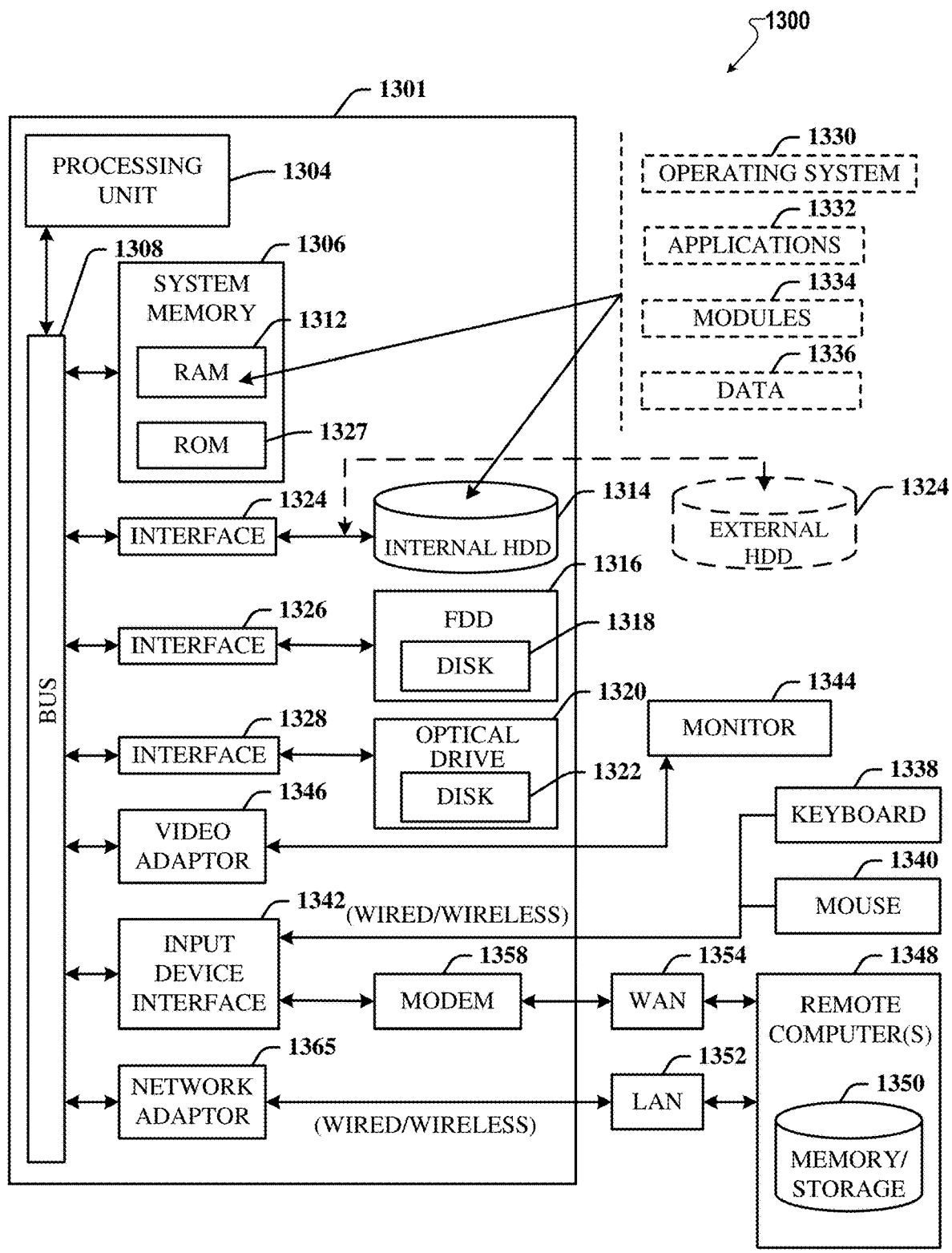
FIG. 13 illustrates an example block diagram of a computer that can be operable to execute processes and methods, in accordance with various aspects and embodiments of the subject disclosure.

FIG. 13 illustrates a block diagram of a computer 1300 operable to execute the functions and operations performed in the described example embodiments. For example, TCF 505 can contain components as described in FIG. 13. The computer 1300 can provide networking and communication capabilities between a wired or wireless communication network and a server and/or communication device. In order to provide additional context for various aspects thereof, FIG. 13 and the following discussion are intended to provide a brief, general description of a suitable computing environment in which the various aspects of the embodiments can be implemented to facilitate the functions and operations described herein. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 13, implementing various aspects described herein, devices can include a computer 1300, the computer 1300 comprising a processing unit 1304, a system memory 1306 and a system bus 1308. The system bus 1308 couples system components comprising the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 comprises read-only memory (ROM) 1327 and random access memory (RAM) 1312. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further comprises an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1312, comprising an operating system 1330, one or more application programs 1332, other program modules 1334 and program data 1336. All or portions of the operating system, applications, modules, and/or data can also be cached in the RAM 1312. It is to be appreciated that the embodiments can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) can include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 2394 serial port, a game port, a USB port, an IR interface, etc.

A monitor 1344 or other type of display device is also connected to the system bus 1308 through an interface, such as a video adapter 1346. In addition to the monitor 1344, a computer 1300 typically comprises other peripheral output devices (not shown), such as speakers, printers, etc.

The computer 1300 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically comprises many, if not all of, the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1300 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/ storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-Ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A device, comprising:
a processor; and
a memory that stores computer executable instructions that, when executed by the processor, facilitate performance of operations, comprising:
receiving, from a network node device of a wireless network, call trace event data for a wireless communication session between the network node device and a user equipment;
sequencing and combining the call trace event data during and for a period of the wireless communication session;
during the wireless communication session, analyzing the call trace event data to determine whether network communication traffic transmitted via a communication channel between the network node device and the user equipment comprises streaming video packets, wherein the call trace event data comprises a radio bearer traffic report comprising information indicating a download volume and an upload volume of the user equipment over a defined time period during a portion of the wireless communication session; and
in response to a determination, based on the analyzing, that the network communication traffic comprises the streaming video packets, initiating directing of network resources to be allocated to support the wireless communication session.

2. The device of claim 1, wherein the network communication traffic is generated by an application executing on the user equipment.

3. The device of claim 1, wherein the call trace event data comprises initial context setup data indicating a first time that the communication channel was established or context release data indicating a second time of a release of the communication channel for future transmissions.

4. The device of claim 1, wherein the operations further comprise:
during the wireless communication session, predicting that the network communication traffic comprises the streaming video packets based on a result of the analyzing of the call trace event data.

5. The device of claim 1, wherein the radio bearer traffic report is a first radio bearer traffic report, and wherein the call trace event data comprises a second radio bearer traffic report comprising a quality of service class identifier used by the device to determine that the network communication traffic comprises voice packets.

6. The device of claim 1, wherein the call trace event data comprises a time stamp indicative of a time at which the call trace event data was recorded.

7. The device of claim 1, wherein the call trace event data comprises a periodically reported measurement indicating a time that measurement signals are transmitted between the user equipment and the network node device.

8. The device of claim 1, wherein the call trace event data comprises handover event data indicating a time of a handover of the wireless communication session from a first mobile network cell of the wireless network to a second mobile network cell of the wireless network.

9. A method, comprising:
receiving, from a second network device by a first network device comprising a processor, call trace event data for a wireless communication session between the second network device and a user equipment;
sequencing and combining, by the first network device, the call trace event data for a time period applicable to the wireless communication session;
during the wireless communication session, analyzing, by the first network device, the call trace event data to determine whether network communication traffic transmitted via a communication channel between the second network device and the user equipment comprises streaming video packets, wherein the call trace event data comprises information relating to a download volume and an upload volume of the user equipment over a defined time period during a portion of the wireless communication session; and
in response to a determination, based on the analyzing, that the network communication traffic comprises the streaming video packets, initiating, by the first network device, direction of network resources to be allocated to support the wireless communication session.

10. The method of claim 9, wherein the network communication traffic is generated by an application executing on the user equipment.

11. The method of claim 9, wherein the initiating the direction of the network resources comprises sending a message to an orchestration manager device, wherein, in response to the message, the orchestration manager device facilitates an allocation of the network resources.

12. The method of claim 9, wherein the network resources are allocated using a software defined networking process.

13. The method of claim 9, wherein the network resources are allocated from a network slice dedicated to performing a defined network function.

14. The method of claim 9, wherein the network resources, when allocated, result in an increase in an amount of bandwidth used for the streaming video packets for the wireless communication session.

15. A machine-readable storage medium, comprising executable instructions that, when executed by a network device comprising a processor, facilitate performance of operations, comprising:
receiving call trace event data from a network node device, wherein the call trace event data is derived from a wireless communication session between the network node device and a user equipment, wherein the wireless communication session carries network communication traffic generated by an application executing on the user equipment;
sequencing and combining the call trace event data during at least part of the wireless communication session;
during the wireless communication session, analyzing the call trace event data to determine whether the network communication traffic transmitted via a communication channel between the network node device and the user equipment comprises video streaming packets, wherein the call trace event data comprises a radio bearer traffic report comprising volume data relating to a download volume and an upload volume of the user equipment over a defined time period during a portion of the wireless communication session; and
in response to a determination, based on the analyzing, that the network communication traffic comprises the streaming video packets, instructing that network resources be allocated to support the wireless communication session.

16. The machine-readable storage medium of claim 15, wherein the call trace event data comprises initial context setup data indicating a time that the communication channel was established.

17. The machine-readable storage medium of claim 15, wherein the call trace event data comprises context release data indicating a time of a release of the communication channel for subsequent communication sessions.

18. The machine-readable storage medium of claim 15, wherein the radio bearer traffic report is a first radio bearer traffic report, and wherein the call trace event data comprises a second radio bearer traffic report comprising a quality of service class identifier used by the network device to determine that the network communication traffic does not comprise streaming video packets.

19. The machine-readable storage medium of claim 15, wherein the call trace event data comprises a time stamp indicative of a time at which the call trace event data was recorded.

20. The machine-readable storage medium of claim 15, wherein the call trace event data comprises a periodically reported measurement indicating a time that measurement signals are transmitted between the user equipment and the network node device.

* * * * *